United States Patent
Kuzhinjedathu et al.

(10) Patent No.: US 11,845,191 B1
(45) Date of Patent: Dec. 19, 2023

(54) ROBOTIC PICKING OF CUBOIDAL ITEMS FROM A PALLET

(71) Applicant: Amazon Technologies, Inc., Seattle, WA (US)

(72) Inventors: Kamal Ramachandran Kuzhinjedathu, Redmond, WA (US); Pinak Shikhare, Seattle, WA (US); Vivek Rangaswamy, Seattle, WA (US); Andres Camilo Cortes Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 752 days.

(21) Appl. No.: 16/453,047

(22) Filed: Jun. 26, 2019

(51) Int. Cl.
- B25J 9/16 (2006.01)
- B65G 47/90 (2006.01)
- B23P 19/00 (2006.01)

(52) U.S. Cl.
CPC ........... *B25J 9/1679* (2013.01); *B23P 19/007* (2013.01); *B25J 9/1602* (2013.01); *B25J 9/1697* (2013.01); *B65G 47/90* (2013.01)

(58) Field of Classification Search
None
See application file for complete search history.

(56) References Cited

U.S. PATENT DOCUMENTS

| | | | | |
|---|---|---|---|---|
| 9,486,921 B1* | 11/2016 | Straszheim | ............ | B25J 9/1679 |
| 2006/0120448 A1* | 6/2006 | Han | ............ | H04N 19/61 |
| | | | | 375/240.03 |
| 2014/0067317 A1* | 3/2014 | Kobayashi | ............ | B25J 9/1697 |
| | | | | 702/153 |
| 2015/0022644 A1* | 1/2015 | Appia | ............ | H04N 13/271 |
| | | | | 348/49 |
| 2015/0352721 A1* | 12/2015 | Wicks | ............ | B25J 9/1687 |
| | | | | 700/228 |
| 2016/0059419 A1* | 3/2016 | Suzuki | ............ | B25J 9/1692 |
| | | | | 901/14 |
| 2017/0132769 A1* | 5/2017 | Barron | ............ | G06T 5/003 |
| 2017/0334066 A1* | 11/2017 | Levine | ............ | G06V 10/82 |
| 2018/0189565 A1* | 7/2018 | Lukierski | ............ | G06V 20/10 |
| 2019/0389082 A1* | 12/2019 | Higo | ............ | B25J 19/023 |

(Continued)

FOREIGN PATENT DOCUMENTS

CN 110480637 A * 11/2019

OTHER PUBLICATIONS

Olaf Ronneberger, U-Net: Convolutional Networks for Biomedical Image Segmentation, May 18, 2015. (Year: 2015).*

(Continued)

*Primary Examiner* — Jeff A Burke
*Assistant Examiner* — Kyle T Johnson
(74) *Attorney, Agent, or Firm* — Kilpatrick Townsend & Stockton LLP

(57) ABSTRACT

Image data from an image sensor is input into a predictive model to identify perimeter edges of a set of cuboidal items held on a pallet. Depth data from a depth sensor is used to identify a top surface of a first cuboidal item of the set of cuboidal items. Coordinates associated with corners of the first cuboidal item are identified using information about the perimeter edges and the top surface. The coordinates are used to generate instructions for a robotic manipulator to pick up the first cuboidal item.

20 Claims, 9 Drawing Sheets

(56) References Cited

U.S. PATENT DOCUMENTS

2020/0094401 A1* 3/2020 Cheng .................. B25J 9/163
2021/0158561 A1* 5/2021 Park .................... G06T 15/20

OTHER PUBLICATIONS

CN-110480637-A translation (Year: 2019).*
Boston Dynamics, "Pick—The Deep-Learning Depalletizing Robot", https://www.bostondynamics.com/pick.

* cited by examiner

ROBOTIC PICKING OF CUBOIDAL ITEMS FROM A PALLET

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators perform tasks under the same conditions. For example, a robotic manipulator may include an end effector that is specialized to grasp a particular class of objects arranged in a predefined manner. If, however, different objects are encountered and/or the objects are arranged in a less defined manner, the robotic manipulator may be unable to successfully manipulate the objects. Because of this, other systems that rely on the objects being manipulated may be impacted and the benefits of the robotic manipulator may be minimized.

BRIEF DESCRIPTION OF THE DRAWINGS

Various examples in accordance with the present disclosure will be described with reference to the drawings, in which.

DETAILED DESCRIPTION

Figure 1:
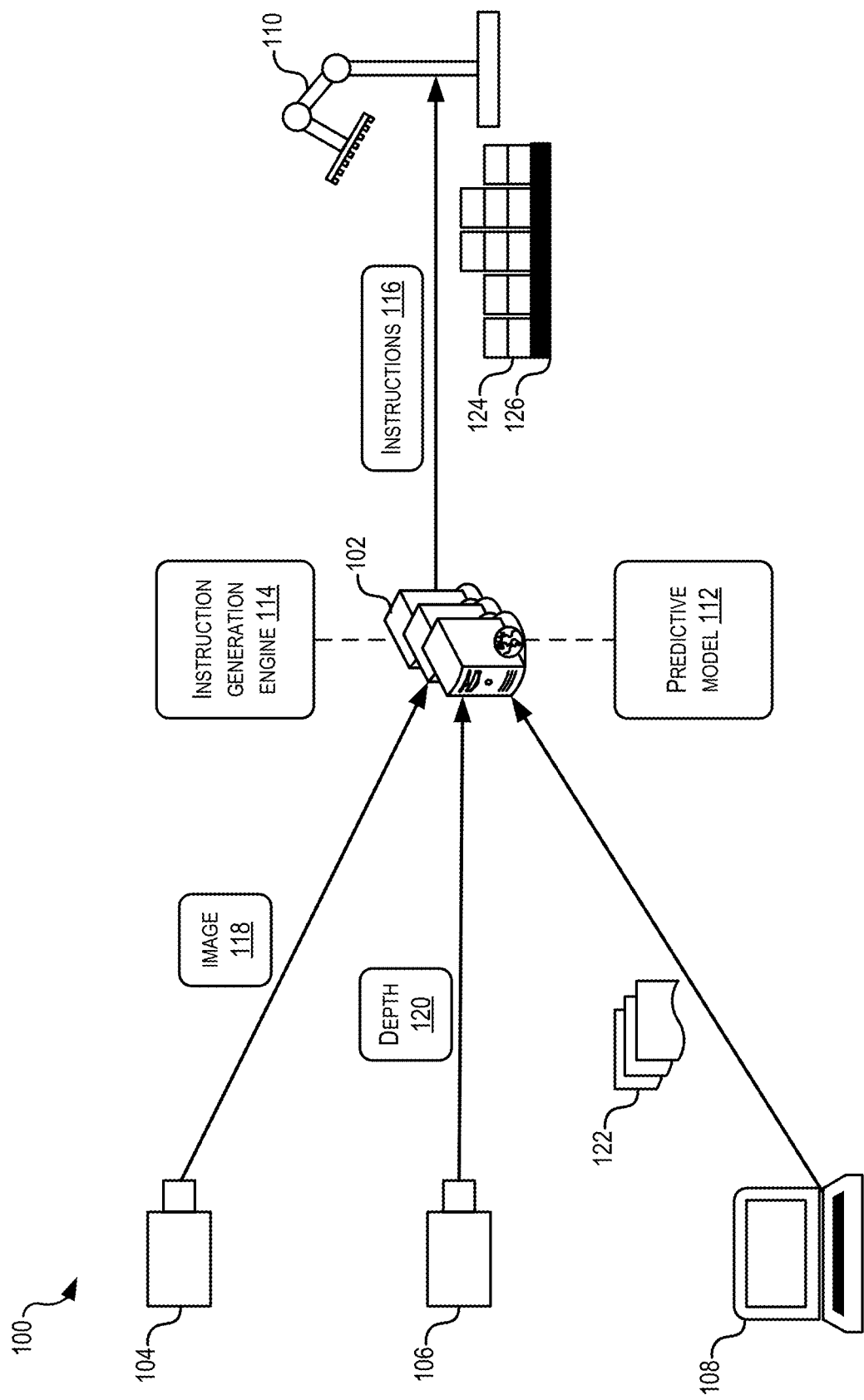
FIG. 1 illustrates a block diagram showing an example system for implementing techniques relating to robotic manipulation of cuboidal items, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to, among other things, systems, devices, and techniques relating to robotic manipulation of cuboidal items. In particular, examples described herein utilize predictive modeling for detection of perimeter item edges, and for generation of instructions for a robotic manipulator to pick up a single item from a pallet of similar or different items and place the single item at a different location (e.g., on a conveyor surface). These examples may be implemented in any suitable material handling system such as one that enables storage and retrieval of items within an item storage facility.

Pallets and other open-top containers can be used for storing and transporting items. For example, items to be stored in an item storage facility may be loaded onto a pallet and transported to the facility using a shipping truck. In some storage arrangements, once the pallet arrives at the facility, the items may be removed from the pallet (e.g., depalletized), singulated (e.g., separated from each other), and stored as individual units, as opposed to being stored all together on the pallet. A robotic manipulation system may be provided to remove individual items from the pallet and thereby singulate the items. The robotic manipulation system may be configured to remove items from pallets that consist of the same items in a uniform packing arrangement (e.g., items in the same orientation on the pallet or in a repeating pattern), the same items in a non-uniform packing arrangement (e.g., items in different orientations on the pallet or in non-repeating patters), different items in a uniform packing arrangement, and different items in a non-uniform packing arrangement.

Turning now to a particular example, in this example, a robotic manipulation system includes a computer system, a red green blue (RGB) camera, a depth camera, and/or a robotic manipulator. The robotic manipulator is placed in an unloading area into which are moved pallets of boxes. The two cameras are mounted above the unloading area with their respective fields of view oriented toward the ground (e.g., a support surface) in the unloading area, e.g., to view top surfaces of the pallets. When a new pallet of boxes is placed in the unloading area, the computer system instructs the cameras to image a top surface of the boxes on the pallet. The RGB camera sends RGB image data of the top surface to the computer system, and the computer system inputs this data into a neural network that operates under the control of the computer system. The neural network uses the RGB image data to predict pixel locations of perimeter edges of the boxes on the pallet. Depth image data of the top surface is also sent to the computer system, and the computer system uses the depth data to identify a top box (or top boxes) on the pallet (e.g., a box that is furthest from the ground). The computer system uses information about the perimeter edges and information about the top box to generate a set of instructions for the robotic manipulator (e.g., coordinates of the box corners in three-dimensional space, yaw of the box, and length and width of the box). The robotic manipulator uses the set of instructions to pick up the box, while leaving other boxes on the pallet, and places the box at a location away from the pallet (e.g., on a conveyor device that moves the box to a storage area). This process may then be repeated for all other boxes on the pallet until all (or some subset of the) boxes have been removed from the pallet.

FIG. 1 illustrates a block diagram showing an example system 100 for implementing techniques relating to robotic manipulation of cuboidal items, according to at least one example. The system 100 includes a robotic instruction generation system 102, an image sensor 104, a depth sensor 106, a computing device 108, and a robotic manipulator 110.

The robotic instruction generation system 102, which is any suitable arrangement of computing devices, server computers, and the like, includes a predictive model 112 and an instruction generation engine 114. In some examples, both the predictive model 112 and the instruction generation engine 114 may be stored in memory of the robotic instruction generation system 102. Generally, the robotic instruction generation system 102 is configured to receive inputs from the image sensor 104, the depth sensor 106, and the user device 108, and use the inputs to generate a set of instructions 116 for the robotic manipulator 110 to manipulate an item 124 such as a cuboidal item stowed on a pallet 126 of items.

The image sensor 104, which may be any suitable image capture device (e.g., RGB camera, RGB video camera, etc.), is configured to output image data 118 of a scene. In the examples described herein, the scene may include a stack of cuboidal items to be removed and singulated by the robotic manipulator 110 (e.g., the pallet 126). The depth sensor 106, which may be any suitable depth sensing device (e.g., time of flight camera, etc.), is configured to output depth data 120 of the scene. The image sensor 104 and the depth sensor 106 are time centralized such that the image data 118 and the depth data 120 can be obtained at identical times. In some examples, this may be achieved by syncing internal clocks of the sensors 104 and 106.

The user device 108, which may be any suitable device with computing capabilities (e.g., a laptop computer, a desktop computer, a handheld user device, a mobile phone, etc.), is configured to provide configuration information 122 about the image sensor 104 and the depth sensor 106 to the robotic instruction generation system 102. The configuration information 122, for example, may define parameters of the sensors 104 and 106 for correlating pixels in output from the sensors 104 and 106, and for correlating pixels in the output with a coordinate system of the robotic manipulator 110, internal clock data, information about lens stack-ups, information about fields of view, etc.

Figure 2:
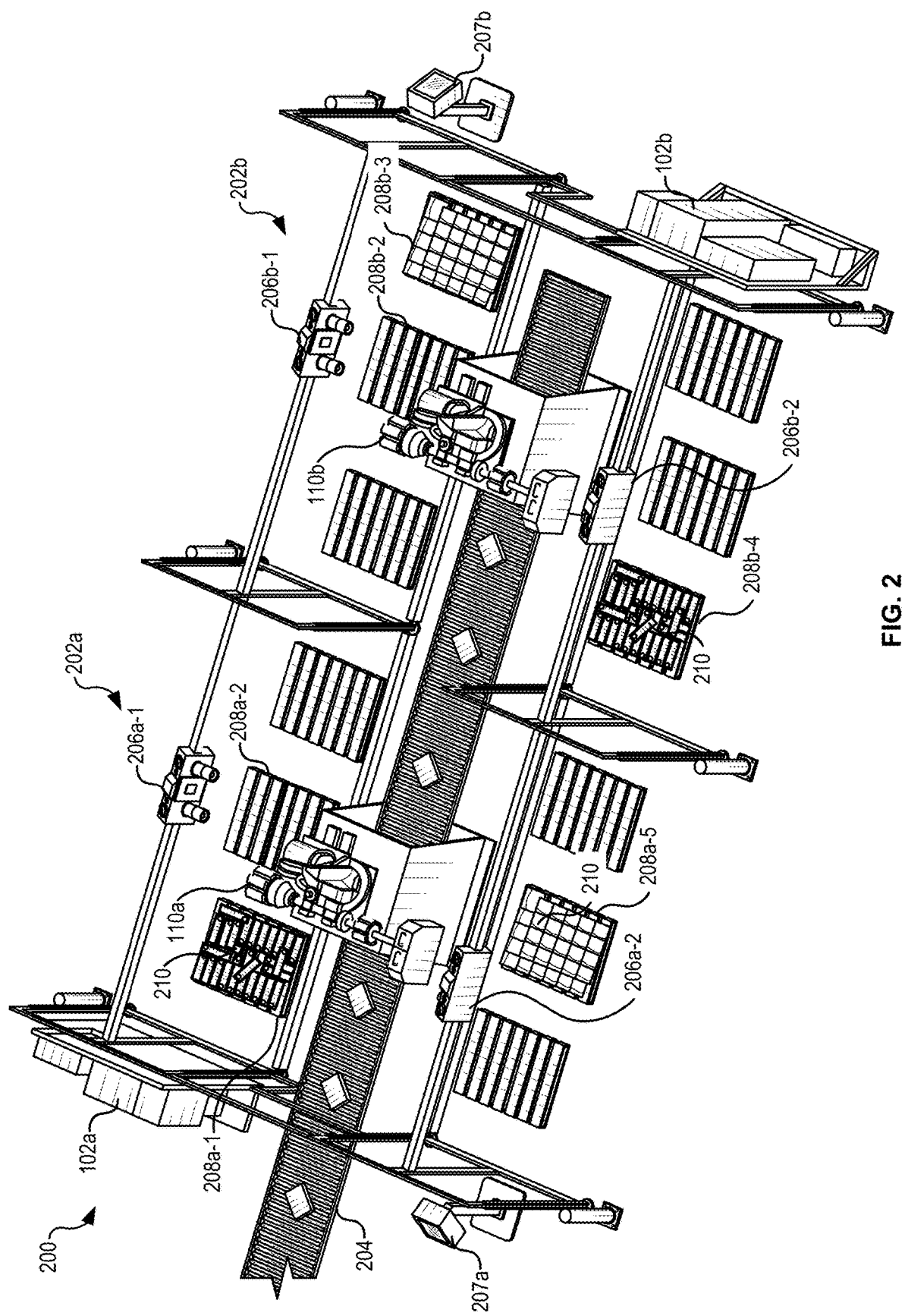
FIG. 2 illustrates a schematic diagram showing an example system for implementing techniques relating to robotic manipulation of cuboidal items within a processing area, according to at least one example.

Turning now to FIG. 2, FIG. 2 illustrates a schematic diagram showing an example system 200 for robotic manipulation of cuboidal items in a processing area 202, according to at least one example. In the illustrated example, the system 200 includes two processing areas 202*a* and 202*b*, sometimes referred to as processing cells or work environments, and a conveyor device 204 extending between the two areas 202. While two processing areas 202 are illustrated, the techniques described herein may be implemented using only one processing area 202 or using more than one processing area 202. In the illustrated example, however, each processing area 202*a* and 202*b* may be considered a stand-alone system, e.g., each processing area 202*a* includes an appropriate collection of system elements to perform the techniques described herein. In some examples, elements of a first processing area 202 may be shared with elements of a second processing area 202 (e.g., a single robotic manipulator 110 may serve both processing areas 202, a single robotic instruction generation system 102 may serve both processing areas 202). The components of the system 200 will now be described with reference to the processing area 202*a*.

The processing area 202*a* includes a robotic instruction generation system 102*a*, a robotic manipulator 110*a*, vision systems 206*a*-1 and 206*a*-2, and a control device 207*a*. The robotic instruction generation system 102*a*, the robotic manipulator 110*a*, the vision systems 206, and the control device 207*a* may be in network and/or electric communication via one or more networks and/or one or more wired electrical connections. The processing area 202*b* includes similar components arranged and configured similarly as the components in the processing area 202*a*.

The processing area 202*a* also includes one or more pallets 208*a*-1-208*a*-6 (e.g., the pallet 126). The pallets 208 may be moved into and out of the processing area 202*a* using a forklift or other such equipment. At least some of the pallets 208 may include stacks of cuboidal items 210 (e.g., the items 124). For example, the pallet 208*a*-1 includes a non-uniform stack including one type of cuboidal item 210 and the pallet 208*a*-2 includes a uniform stack including a different type of cuboidal item 210. Generally, the robotic instruction generation system 102*a* may instruct the robotic manipulator 110*a* to remove cuboidal items 210 from one of the pallets 208*a*-1 or 208*a*-2 and place the removed cuboidal item 210 on the conveyor device 204 for movement outside of the processing area 202*a*.

In the illustrated example, the conveyor device 204, which may be any suitable apparatus for moving the items 210, continues below the robotic manipulators 110. Such an arrangement enables the robotic manipulators 110 to pick the items 210 from the pallets 208 on two sides (e.g., on both sides of the conveyor device 204). In some examples, the robotic processing areas 202 may be arranged such that the robotic manipulators 110 pick the items 210 from the pallets 208 on a first side of the robotic manipulator 110 and place the items 210 on a second side of the robotic manipulator 110. Other arrangements of the robotic manipulator 110, the pallets 208, and the conveyor device 204 are also contemplated. In some examples, the conveyor device 204 may be excluded from the system all together.

The robotic instruction generation system 102*a* may be a local server computer. In some examples, the robotic instruction generation system 102*a* may be a cloud-based server and/or include at least some virtual resources. As introduced previously, the robotic instruction generation system 102*a* includes the instruction generation engine 114 and the predictive model 112.

Generally, the instruction generation engine 114 may be configured to perform the functions described with reference to the flow charts. For example, the instruction generation engine 114 may control the operation of the vision systems 206*a* to gather and share sensor data and use the sensor data to generate instructions for the robotic manipulator 110*a*.

Generally, the predictive model 112 is used by the instruction generation engine 114 as part of generating the instructions for the robotic manipulator 110*a*. The predictive model 112 may, in some examples, be a deep convolutional neural network based on the U-Net framework or any other suitable model capable of detecting item edges.

The vision system 206*a* includes a housing that supports both an image sensor (e.g., the image sensor 104) and a depth sensor (e.g., the depth sensor 106). The vision system 206 may also include other computing components comparable to the robotic instruction generation system 102 such that, in some examples, the vision system 206 may perform the function of the instruction generation engine 114 and manage the predictive model 112. The vision system 206 is described in more detail with reference to FIG. 3. While the vision system 206 is illustrated as including both an image sensor and a depth sensor in a single housing. In some examples, the image sensor (e.g., the image sensor 104) and the depth sensor (e.g., the depth sensor 106) are implemented as their own standalone devices.

The robotic manipulator 110 may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles items). The robotic manipulator 110 is configured to pick up the items 210 from the pallets 208 and place the items 210 singularly on the conveyor device 204, as illustrated. In some examples, the robotic manipulator 110 may be configured to place the items 210 singularly at a location other than the conveyor device 204.

Each robotic manipulator 110 may include any suitable type and number of sensors disposed throughout the robotic manipulator 110 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 110, including the end effector. The sensors may be in communication with a management device (e.g., a local computer) that is local to the robotic manipulator 110 and/or in direct communication with the robotic instruction generation system 102. In this manner, the robotic instruction generation system 102 may control the operation of the robotic manipulator 110 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 110, different end effectors (e.g., end of arm tools) may be selected. For manipulation of cuboidal items, as described herein, the robotic manipulator 110 may include an end effector that includes a plurality of suction devices arranged in a grid and capable of selective manipulation. For example, depending on the size of a top surface of a cuboidal item 210, certain ones of the suction devices may be turned on and others turned off. This enables the end effector to move to top surface on a pallet 208 that includes multiple items 210 aligned with the top surface, and pick only one item 210 from the top surface. To do this, only the suction devices that would correspond to the item 210 to be picked will be turned on.

Information about the end effectors available may be organized in terms of grasping function (e.g., in a database). A grasping function may define functionally how an end effector is capable of manipulating an object. The grasping function may differ between end effectors with respect to capacities, categories, and physical limitations. Example categories of end effectors include: magnetized end effectors, soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The control device 207a may include one or more interfaces to enable manual control of the robotic manipulator 110a. In some examples, the control device 207a includes a display at which is output by the robotic instruction generation system 102a information about the operation of the system 200. In some examples, the control device 207a may be used to collect training data for the predictive model 112. For example, a user interface may be presented on the control device 207a that includes two buttons, a "good pick" button and a "bad pick" button. The user may watch the robotic manipulator 110a attempt to pick up an item 210. If the pick by the robotic manipulator 110a was successful (e.g., a "good pick"), the user may select the "good pick" button. Likewise, if the pick was unsuccessful (e.g., a "bad pick"), the user may select the "bad pick" button. The data received about the picks may be associated with the robotic manipulation instructions used by the robotic manipulator 110a to attempt the pick of the item 210 and with the underlying image and depth data used to generate the robotic instructions. In particular, the data may be associated with the image data that was fed into the predictive model 112. This data may be fed back into the predictive model 112 for additional training.

Figure 3:
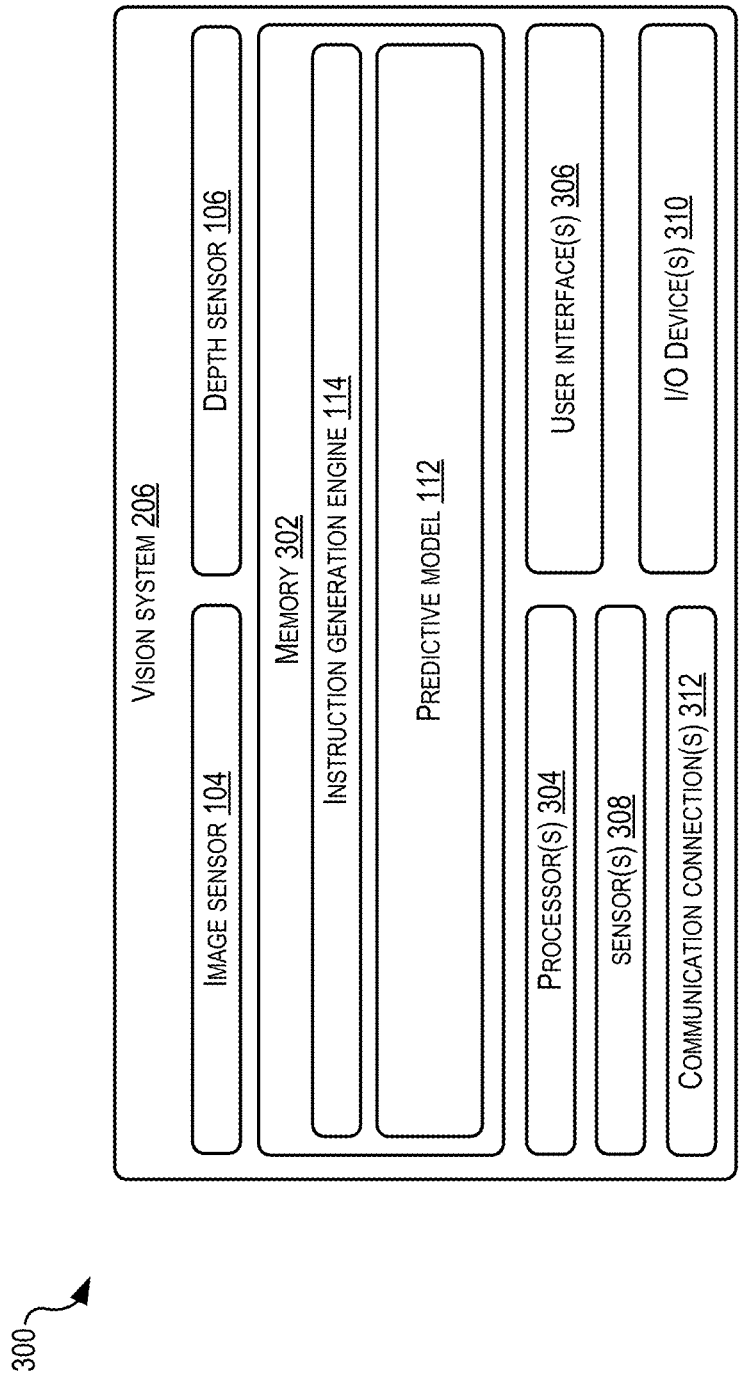
FIG. 3 illustrates a block diagram showing an example device including a vision system for implementing techniques relating to robotic manipulation of cuboidal items within a processing area, according to at least one example.

FIG. 3 illustrates a block diagram showing an example device 300 including the vision system 206. The vision system 206, as introduced herein, may be implemented in a single purpose-built device. In particular, the vision system 206 may be built within a single housing. The vision system 206 includes the image sensor 104, the depth sensor 106, a memory 302, one or more processors 304, one or more user interfaces 306, one or more sensors 308, one or more input/output devices 310, and one or more communication connections 312.

The memory 302 may store program instructions that are loadable and executable on the processor(s) 304 (e.g., the instruction generation engine 114 and the predictive model 112), as well as data generated during the execution of these programs. Depending on the configuration and type of the vision system 206, the memory 302 may be volatile (such as RAM) and/or non-volatile (such as ROM, flash memory, etc.). The memory 302 and associated non-transitory computer-readable media may provide non-volatile storage of computer-readable instructions, data structures, program modules, and other data for the computing devices. In some implementations, the memory 302 may include multiple different types of memory, such as SRAM, DRAM, or ROM. While the volatile memory described herein may be referred to as RAM, any volatile memory that would not maintain data stored therein once unplugged from a host and/or power would be appropriate. The memory 302, both removable and non-removable, are both additional examples of non-transitory computer-readable storage media.

The processor(s) 304 may be implemented as appropriate in hardware, computer-executable instructions, firmware, or combinations thereof. Computer-executable instruction or firmware implementations of the processor(s) 304 may include computer-executable or machine-executable instructions written in any suitable programming language to perform the various functions described. In some examples, the processors 304 may include and/or may be one or more graphics processing units configured to efficiently and quickly process data from the image sensor 104 and the depth sensor 106, run processes relating to the predictive model 112, generating the robotic instructions, and the like.

The communications connection(s) 312 may allow the vision system 206 to communicate with a data store, another computing device or server, user terminals and/or other devices via a network. In this manner, the communications connections 312 can include network interfaces to enable connection to network devices. The I/O device(s) 310 may include a keyboard, a mouse, a pen, a voice input device, a touch input device, a display, speakers, a printer, etc. The user interfaces 306 may enable a user to interact with and/or otherwise control aspects of the vision system 206. The sensors 308 may include any suitable combination of sensors such as a temperature sensor, orientation sensor, position sensor, and the like, the output of which may be used by the instruction generation engine 114 for configuring the vision system 206.

FIGS. 4, 5, 6, and 8 illustrate example flow diagrams showing respective processes 400, 500, 600, and 800 as described herein. These processes 400, 500, 600, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 4:
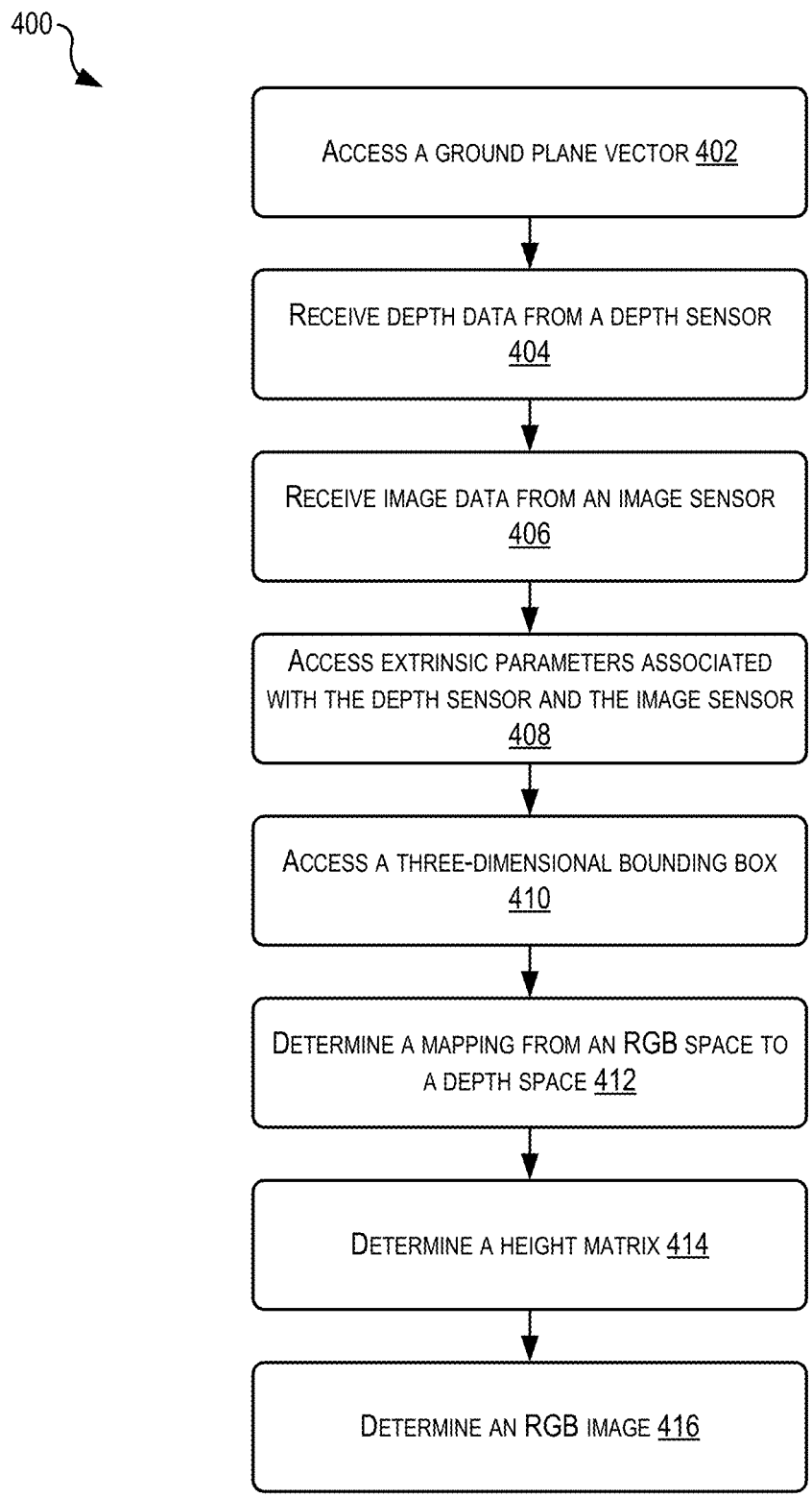
FIG. 4 illustrates a flow diagram showing an example process for implementing techniques relating to robotic manipulation of cuboidal items, according to at least one example.
Figure 5:
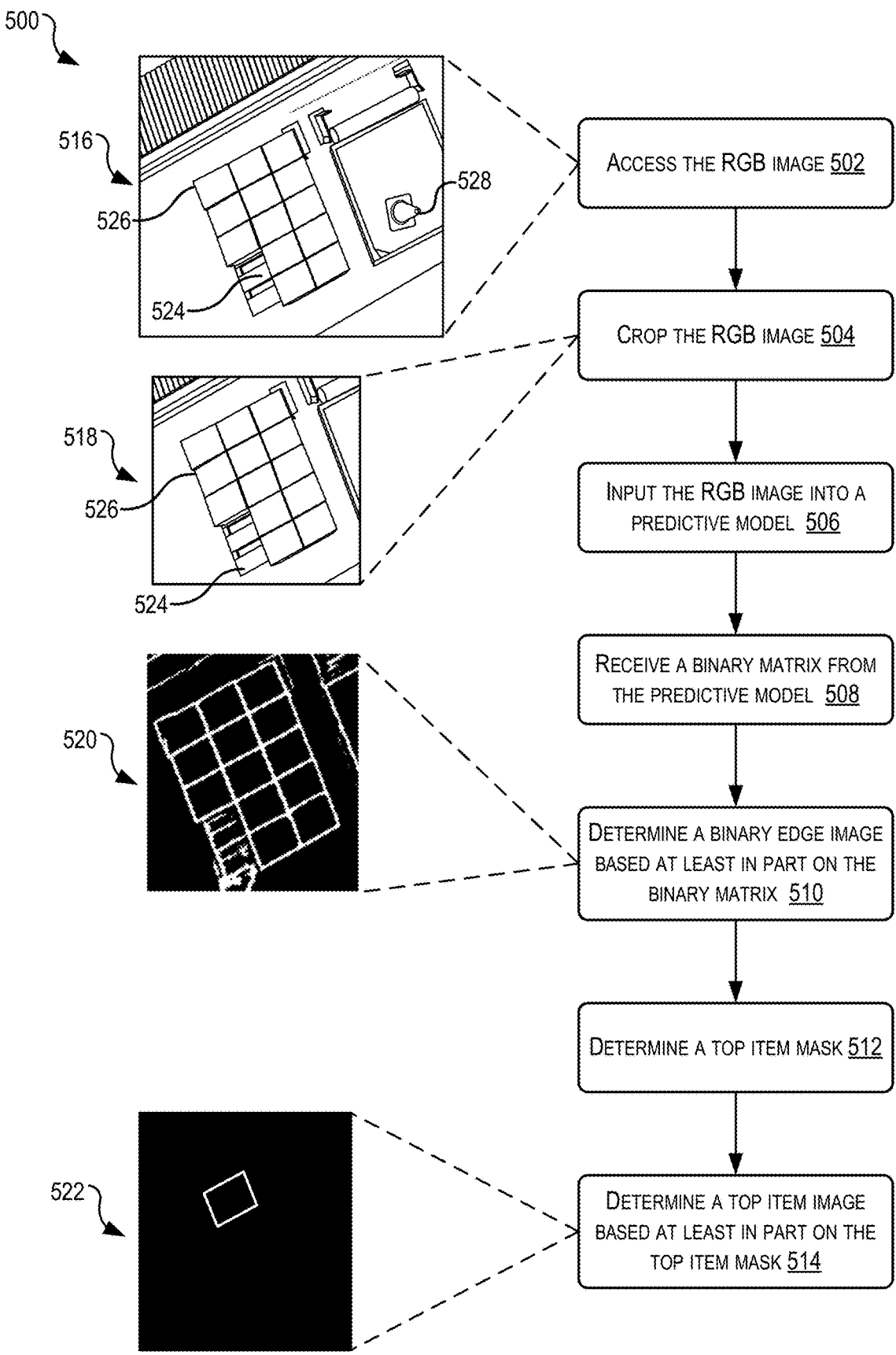
FIG. 5 illustrates a flow diagram showing an example process for implementing techniques relating to robotic manipulation of cuboidal items, according to at least one example.
Figure 6:
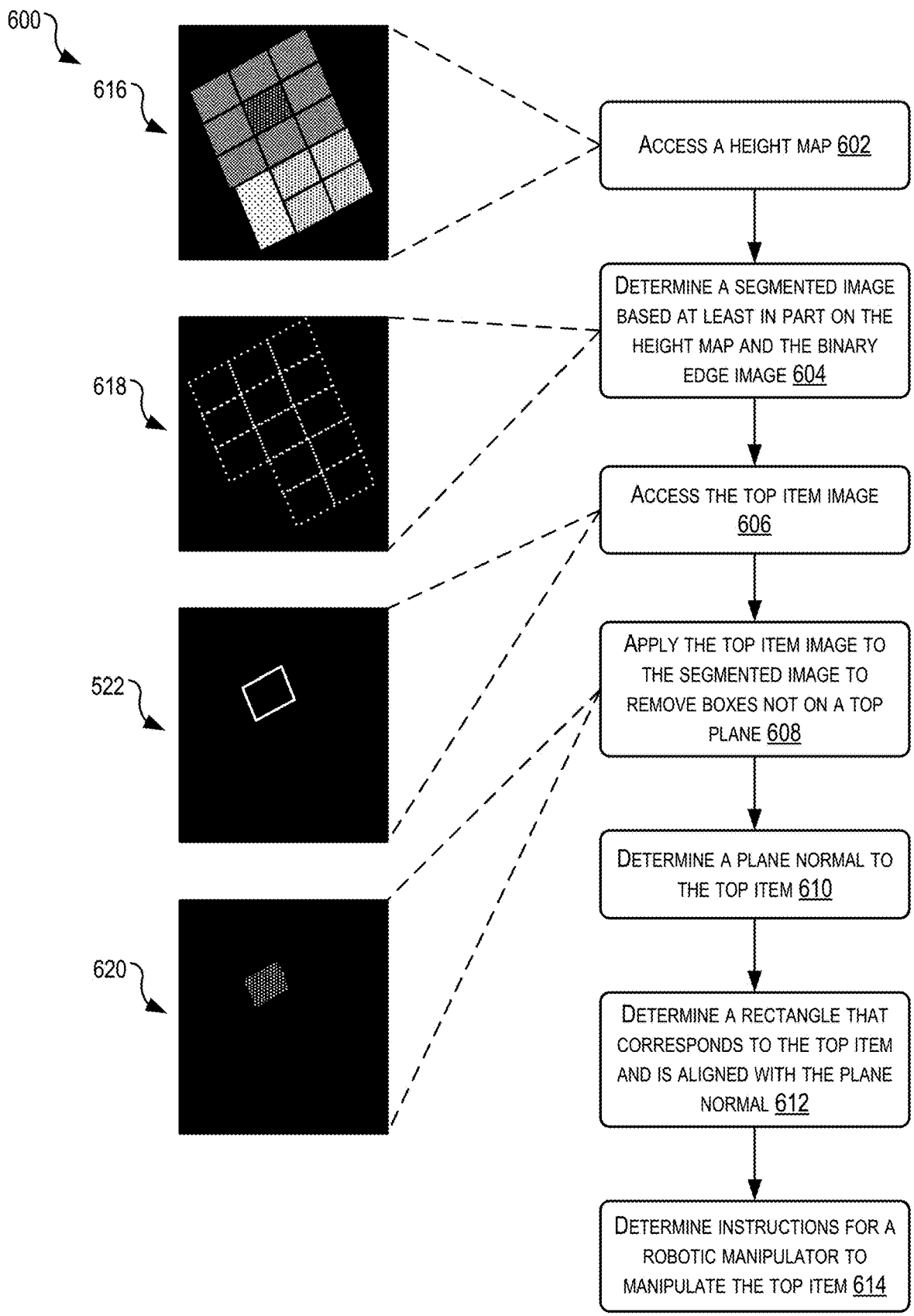
FIG. 6 illustrates a flow diagram showing an example process for implementing techniques relating to robotic manipulation of cuboidal items, according to at least one example.

FIG. 4 depicts the process 400 for implementing techniques relating to robotic manipulation of cuboidal items, according to at least one example. The instruction generation engine 114 (FIG. 1) may perform the process 400 of FIG. 4. FIGS. 4-6 illustrate various stages of generating robotic instructions for manipulation of cuboidal items. FIG. 4 illustrates a pre-process stage in which the instruction generation engine 114 computes an RGB image, outputs a height matrix representing a height above the ground for each indexed point in a point cloud, and outputs a mapping from a two-dimensional RGB space (e.g., a coordinate system of the image sensor 104) to a three-dimensional depth space (e.g., a coordinate system of the depth sensor 106) that allows for matching points in between the two spaces.

The process 400 begins at 402 by the instruction generation engine 114 accessing a ground plane vector associated with a coordinate frame of the depth sensor 106 camera. This may be performed upon receiving an RGB image. The ground plane vector may be accessed from a configuration file associated with the depth sensor 106. The configuration file may be stored in memory of the depth sensor 106 and/or may be stored in connection with an external device (e.g., the user device 108).

At 404, the process 400 includes the instruction generation engine 114 receiving depth data from a depth sensor. In some examples, this may include receiving the depth data from the depth sensor 106. The depth data may include a point cloud corresponding to a volume within a field of view of the depth sensor 106. In some examples, the point cloud may correspond to an area within a processing area (e.g., the processing area 202) where the pallets 208 are placed. The depth data may be associated with a first coordinate system (e.g., a three-dimensional coordinate system).

At 406, the process 400 includes the instruction generation engine 114 receiving image data from an image sensor. In some examples, this may include receiving the image data from the image sensor 104. The image data may correspond to an area within the processing area where the pallets 208 are placed. The image data may be associated with a second coordinate system (e.g., a two-dimensional coordinate system).

At 408, the process 400 includes the instruction generation engine 114 accessing extrinsic parameters associated with the depth sensor and the image sensor. The extrinsic parameters may be accessed from one or more configuration files associated with the depth sensor and/or the image sensor, and/or may be received directly from the depth sensor and/or image sensor. The configuration file may be stored in memory of the sensors 104, 106 and/or stored in connection with an external device (e.g., the user device 108).

At 410, the process 400 includes the instruction generation engine 114 accessing a three-dimensional bounding box. The three-dimensional bounding box may be defined within the first coordinate system. The bounding box may be user-defined and correspond to a working zone of the robotic manipulator 110. For example, the bounding box may define a volume of space in which the robotic manipulator 110 may move to manipulate items. In some examples, the bounding box may correspond to an area within the processing area where the pallets 208 are placed and extending to where the items are dropped (e.g., on the conveyor device 204).

At 412, the process 400 includes the instruction generation engine 114 determining a mapping from the RGB space to the depth space. Determining the mapping may include projecting the depth space (e.g., the point cloud) into the RGB space using a projection algorithm (e.g., CV2's projectPoints) and the extrinsic parameters for the image sensor 104 and the depth sensor 106. The mapping, which may be referred to as a mapping matrix, may contain a corresponding index into the RGB space from the depth space. For example, the value of the mapping matrix at index (X, Y) is the index of the RGB image that corresponds to the (X, Y) three-dimensional vector from the depth space. Because the depth sensor 106 can observe points that are not within the image sensor's 104 field of view, there will be points in the mapping matrix that are invalid. In some examples, the process 400 may further include removing these points from the mapping matrix.

At 414, the process 400 includes the instruction generation engine 114 determining a height matrix. This may include applying a mask derived from the bounding box to remove points outside of the working zone of the robotic manipulator 110.

At 416, the process 400 includes the instruction generation engine 114 determining a RGB image by at least using the height of the ground plane to transform the height matrix to be in reference with the ground plane rather than the depth sensor 106.

FIG. 5 illustrates a flow diagram showing an example process 500 for implementing techniques relating to robotic manipulation of cuboidal items, according to at least one example. The instruction generation engine 114 (FIG. 1) may perform the process 500 of FIG. 5. FIG. 5, in particular, illustrates an edge detection stage in which the instruction generation engine 114 computes a binary edge image and a binary top item image using the RGB image generated by the process 400 or obtained in some other fashion. The edge detection stage may follow the pre-processing stage described with reference to FIG. 4. In addition to a set of process blocks 502-514 that make up the process 500, FIG. 5 also includes a set of images 516-522 which correspond to certain blocks and are included to better illustrate the functions of the respective blocks.

The process 500 begins at 502 by the instruction generation engine 114 accessing the RGB image 516. In some examples, the RGB image 516 is the same image referenced in the process 400. In some examples, the RGB image 516 is accessed directly from an image sensor such as the image sensor 104 without any pre-processing. The RGB image 516, while illustrated in black and white lines, may also include colors and additional graphical details. The RGB image 516 depicts a pallet 524 (e.g., the pallets 208) on which is stacked a plurality of cuboidal items 526 (e.g., the cuboidal items 210). The RGB image 516 also depicts other items (e.g., cone 528) within the image frame, which may not be relevant to implementing the processes described herein for generating instructions for a robotic manipulator. As such, at 504, the process 500 includes the instruction generation engine 114 cropping the RGB image 516 to form the RGB image 518. In some examples, the RGB image 516 may be cropped to focus on the pallet 524 using any suitable technique. In some examples, the block 504 may be excluded from the process 500, e.g., the RGB image 516 may not be cropped.

At 506, the process 500 includes the instruction generation engine 114 inputting the RGB image (e.g., the image 516 or the image 518) into a predictive model (e.g., the predictive model 112). The image data that represents the RGB image may be passed to the predictive model 112 by the instruction generation engine 114.

At 508, the process 500 includes the instruction generation engine 114 receiving a binary matrix from the predictive model 112. In some examples, the binary matrix is formed by the predictive model computing probabilities that each pixel in the image is one of a set of features. For purposes of this description, the pixels that correspond to the perimeter edges of items may be of the most interest. As such, the probabilities that pixels represent perimeter edges of items in excess of some threshold may be used to form the binary matrix. In some examples, the binary matrix has two dimensions and indicates for each pixel in the RGB image a prediction of whether the respective pixel is an edge of a cuboidal item or is not an edge. The predictive model 112 has been trained to distinguish between edges of cuboidal items and other features in the images having similar properties. For example, the predictive model 112 can distinguish between a perimeter edge of a top surface of a cuboidal item and a seam along the top surface that extends between two sides of perimeter edge.

At 510, the process 500 includes the instruction generation engine 114 determining a binary edge image 520 based at least in part on the binary matrix. The binary edge image 520 is a graphical representation of the data from the binary matrix. In particular, in the binary edge image 520, features predicted to be edges are shown in white lines and everything else is shown in black. The binary edge image 520 may be saved off as it will be used in later processes.

At 512, the process 500 includes the instruction generation engine 114 determining a top item mask. One purpose of the techniques described herein is to pick the cuboidal item 526 that is farthest from the ground in order to increase the stability of the entire pallet 524. As cuboidal items 526 can lie on the same plane, there can be many cuboidal items 526 that are at the top of the pallet 524. With this in mind, the top item mask may be generated by at least thresholding the point cloud values (obtained with respect to the process 400) based on whether a point is taller than some threshold percentage of all the other valid points. In some examples, the threshold percentage may be about 98%. In some examples, the threshold percentage may be lower or may be higher than 98%. The threshold percentage may be derived manually by tuning the percentile until outlier points do not affect the thresholding. In some examples, the process 500 also includes dilating the top item mask to fill in holes in the binary matrix caused by invalid points from the depth data and eroded to prevent incorrectly labeling the edges of other cuboidal items 524 as being at the top of the pallet 524.

At 514, the process 500 includes the instruction generation engine 114 determining a top item image 522 based at least in part on the top item mask. In some examples, this may include applying the top item mask to the binary edge image. Thus, the top item image 522 may be a binary edge image that depicts only those cuboidal items 526 (e.g., one or more) that are furthest from the ground, e.g., represent a top surface of the stack of cuboidal items 526 on the pallet 524.

FIG. 6 illustrates a flow diagram showing an example process 600 for implementing techniques relating to robotic manipulation of cuboidal items, according to at least one example. The instruction generation engine 114 (FIG. 1) may perform the process 600 of FIG. 6. FIG. 6, in particular, illustrates a post-processing stage in which the instruction generation engine 114 computes instructions for a robotic manipulator to pick a cuboidal item 526 (e.g., a pick point) from the pallet 524. In some examples, the post-processing stage may occur following the pre-processing stage and the edge detection stage. In addition to a set of process blocks 602-614 that make up the process 600, FIG. 6 also includes a set of images 616-620 and 522 which correspond to certain blocks and are included to better illustrate the function of the respective blocks.

The process 600 begins at 602 by the instruction generation engine 114 accessing a height map 616. The height map 616 may have been generated from the depth image obtained in process 400 from the depth sensor 106.

At 604, the process 600 includes the instruction generation engine 114 determining a segmented image 618 based at least in part on the height map and the binary edge image. In some examples, the segmented image 618 includes a plurality of blobs, with each blob being one of the cuboidal items 526. For example, if an image contains three cuboidal items, the block 604 will produce an image with three blobs that have a unique label on each pixel that corresponds to the unique cuboidal item. In some examples, a matrix corresponding to the segmented image 618 may be cleaned up by removing small blobs that do not correspond to cuboidal items.

At 606, the process 600 includes the instruction generation engine 114 accessing the top item image (e.g., the top item image 522). In some examples, the top item image is one of the images produced by the process 500.

At 608, the process 600 includes the instruction generation engine 114 applying the top item image 522 to the segmented image 618 to remove boxes not on a top plane. For example, because the top item image 522 represents the top cuboidal item, the top item image 522 can be used to mask the segmented image 618 to identify the top cuboidal item represented in segmented top item image 620.

At 610, the process 600 includes the instruction generation engine 114 determining a plane normal to the top item identified in the segmented top item image 620. In some examples, this may include using the mapping matrix determined by the process 400 to acquire the indices in the depth coordinate system to top item(s) in the segmented top item image 620. In this example, a single item is located at the top surface. Using the point cloud indices, the plane normal is fit to the top items to align the top items in the RGB space such that the top items are roughly normal to the gravity direction.

At 612, the process 600 includes the instruction generation engine 114 determining a rectangle (e.g., a two-dimensional bounding box) that corresponds to the top item and is aligned with the plane normal. In some examples, a rectangle is selected because of the cuboidal shape of the items. In some examples, determining the rectangle may include fitting the points corresponding to the aligned items and transforming these points to the depth space. In some examples, this transformation may enable the system to identify the corners of the top item in three-dimensional space (e.g., three-dimensional coordinates of the corners). In some examples, this process may be performed for the remaining items in the segmented image 618, resulting in an array of three-dimensional box corners.

At 614, the process 600 includes the instruction generation engine 114 determining instructions for a robotic manipulator to manipulate the top item. The three-dimensional coordinates of the corners represent all the candidate items that the instruction generation engine 114 has determined as viable for picking. Given all the candidate items, determining the instructions may include selecting the item with a tallest centroid and arbitrarily breaking ties by selecting the item with the smallest X-Y centroid location, prioritizing a smaller X value over a smaller Y value. In this manner, the resulting output of the process 600 may be coordinates of the selected item corners if a valid item is present, otherwise a signal is propagated that there is no valid items to pick.

In some examples, determining the instructions for the robotic manipulator may further include transforming each of the corner coordinates of the selected item to the pallet coordinate frame. In some examples, because the robotic manipulator may expect the corners to be in clockwise order, with the most closest point to origin (0,0) being the bottom left point, the process 600 may further include reordering at least some of the corner points. In some examples, the process 600 may further include performing a final check to confirm that coordinates are within the robotic manipulator's work zone and within the expected pallet zone. If either of these checks fails, then the pick point may be ignored and a signal may be sent to the system that no valid pick point was found. If the corners are valid then the centroid of the box represented by the corners is used as the X-Y-Z for the pick point. In some examples, the process 600 further includes determining the roll-pitch-yaw from the corners and appended to the X-Y-Z point to create the pick point. In some examples, the process 600 further includes sending the pick point to the robotic manipulator (e.g., to a management device of the robotic manipulator).

Figure 7:
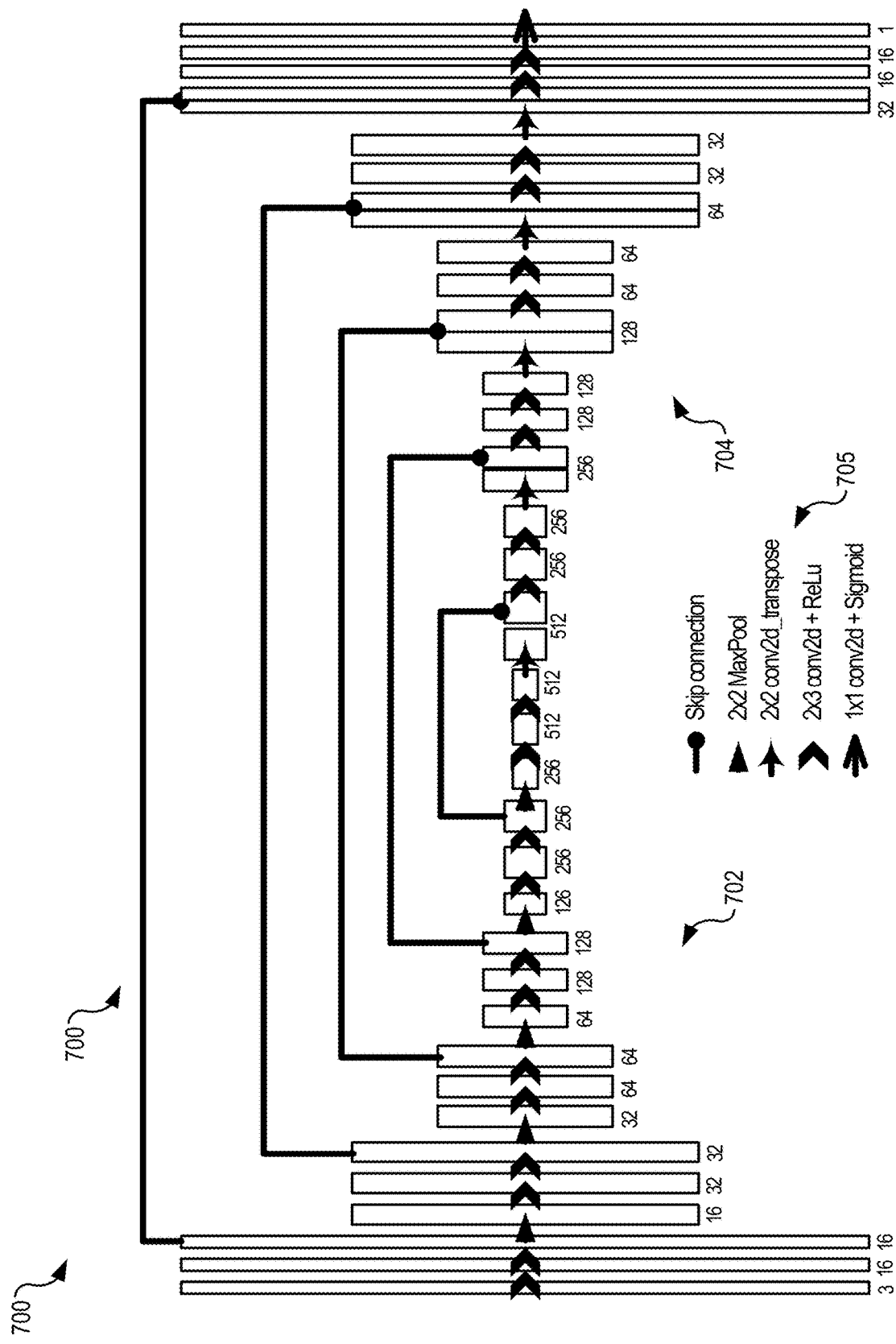
FIG. 7 illustrates a schematic diagram showing a predictive model for implementing techniques relating to robotic manipulation of cuboidal items, according to at least one example.

FIG. 7 illustrates a schematic diagram showing a predictive model 700 for implementing techniques relating to robotic manipulation of cuboidal items, according to at least one example. The predictive model 700 is an example of the predictive model 112. The predictive model 700 may be an adapted version of the U-Net architecture.

The predictive model 700 may include a series of downsampling (contracting) layers 702 and a series of upsampling (expanding) layers 704. The connections between the layers 702, connections between the layers 704, and connections between the layers 702 and 704 are identified in connection list 705. The expanding layers 704 may be symmetric. The contracting layers 702 may be configured to capture context for each output pixel. The expanding layers 704 may enable precise localization. In some examples, the contracting layers 702 may use max-pooling (non-learnable) while the expanding layers 704 may use 2×2 strided transpose convolutions (learnable). In some examples, the early layers in the predictive model 700 detect low level features in the images (e.g., colors and edges) and the later layers aim to learn higher level features (e.g., features representing properties such as box edge). In some examples, the skip connections 706 (e.g., the lines extending between the contracting layers 702 and the expanding layers 704) may allow the predictive model 700 to capture context at different granularities as the predictive model 700 upsamples to not lose low level context due to the many nested layers in the predictive model 700. In some examples, the selection of the number of contracting layers 702 and the expanding layers 704 may be based on the effective receptive field calculation. For example, it may be relevant to obtain an effective receptive field at the most contracted layer 702 that can capture the largest cuboidal item in the input image. In some examples, this may reduce the likelihood of the predictive model 700 confusing artifacts within the cuboidal item (e.g., tape edges, box seams, text, and other markings on the top surface of the cuboidal item) as another item since the predictive model 700 gets to see more context.

In some examples, the predictive model may be trained using human-labeled images where the inputs are RGB images and the labels are binary images with the box boundaries labeled. In some examples, the techniques described herein may be configured to auto-label images for additional training and/or for feedback into the predictive model 700. For example, after an item has been removed from a pallet, the techniques described herein may determine its position in the pallet by taking a difference between the previous depth map and the current depth map. Comparing these two depth maps may reveal a differential depth map including differential depth data. This differential depth map may be used to produce an annotation for a single item (e.g., the item that was removed). In some examples, to label all edges in the image (e.g., to obtain more robust training images), the techniques described herein may use a weighted loss function and a pixel mask to give pixels outside the area of interest a zero. In some examples, loss for a single image is computed using the equation (i).

$$L_{weighted} = \frac{1}{\sum_{i=1}^{n} m_i} \sum_{i=1}^{n} (f(x)_i - y_i)^2 m_i \cdot n \qquad (i)$$

In equation (i), n is the number of pixels, m is the cost mask vector with dimension n.

Figure 8:
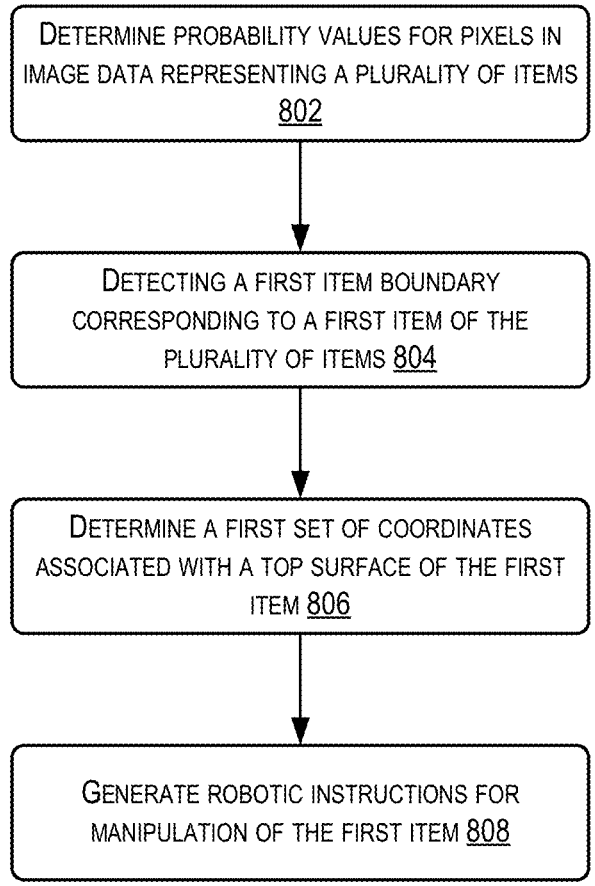
FIG. 8 illustrates a flow diagram showing an example process for implementing techniques relating to robotic manipulation of cuboidal items, according to at least one example.

FIG. 8 illustrates a flow diagram showing an example process 800 for implementing techniques relating to robotic manipulation of cuboidal items, according to at least one example. The instruction generation engine 114 (FIG. 1) may perform the process 800 of FIG. 8. FIG. 8, in particular, corresponds to a process for generating robotic instructions for manipulating an item.

The process 800 begins at 802 by the instruction generation engine 114 determining, probability values for pixels in image data representing a plurality of items. In some examples, the plurality of items may include a plurality of cuboidal items. In some examples, determining the probability values may include determining using a predictive model such as the predictive model 112. Individual probability values of the probability values may indicate probabilities that pixels in the image data represent item boundaries corresponding to the plurality of items. In some examples, the predictive model may include a set of contracting layers configured to capture context of each pixel in the image data, and a set of expanding layers configured to localize each pixel in the image data. The predictive model may be a neural network based on the U-Net architecture. The predictive model may include a plurality of skip connections extending between the set of contracting layers and the set of expanding layers.

At 804, the process 800 includes the instruction generation engine 114 detecting a first item boundary corresponding to a first item of the plurality of items. In some examples, detecting the first item boundary may be based at least in part on probability values of first pixels representing the first item boundary determined at block 802.

At 806, the process 800 includes the instruction generation engine 114 determining a first set of coordinates associated with a top surface of the first item. In some examples, determining the first set of coordinates may be based at least in part on depth data. In some examples, determining the first set of coordinates may include determining a first plane corresponding to the top surface of the first item based at least in part on the depth data.

At 808, the process 800 includes the instruction generation engine 114 generating robotic instructions for manipulation of the first item. In some examples, determining the robotic instructions may be based at least in part on the first item boundary and the first set of coordinates. In some examples, determining the robotic instructions may be based at least in part on the a centroid of the first item. The robotic instructions, in some examples, may include three-dimensional coordinates of the first item, a yaw of the first item, and length and width of the first item. In some examples, the roll and pitch of the first item may be assumed to be zero.

In some examples, the process 800 may further include, prior to determining the first set of coordinates, determining a first plane corresponding to the first top surface of the first item based at least in part on the depth data, and determining a first bounding box that is aligned with the first plane and represents the first top surface of the first item. In this example, the first set of coordinates may represent corners of the first bounding box.

In some examples, the process 800 may further include receiving configuration information associated with at least one of the image data or the depth data. In this example, detecting the first item boundary and determining the first set of coordinates may be based at least in part on the configuration information. In some examples, the configuration information may represent at least one of (i) one or more properties of an image sensor that outputs the image data, (ii) information for mapping an image space associated with the image sensor to a depth space associated with a depth sensor that outputs the depth data, or (iii) information for transforming from the depth space to a robotic manipulator space associated with a robotic manipulator configured to implement the robotic instructions.

In some examples, the process 800 may further include receiving the image data from an image sensor (e.g., the image sensor 104) positioned to image the plurality of items, receiving the depth data from a depth sensor (e.g., the depth sensor 106) positioned to image the plurality of items. In some examples, wherein a first clock of the image sensor and a second clock of the depth sensor are coordinated.

In some examples, the process 800 may further include instructing the image sensor to capture the image data and instructing the depth sensor to capture the depth data. Both the image data and the depth data may represent the plurality of items.

In some examples, the process 800 may further include instructing the robotic manipulator to manipulate the first item in accordance with the robotic instructions.

In some examples, the process 800 may further include comparing a portion of the depth data with other depth data obtained after the robotic manipulator has manipulated the first item to generate differential depth data, and processing the differential depth data to: determine a successful movement of the first item, and associate the differential data with a label representing the successful movement to define labeled differential data. In some examples, the process 800 may further include using the labeled differential data to train the predictive model.

In some examples, the plurality of items may be disposed on a pallet. In this example, generating the robotic instructions may include transforming the set of coordinates to a pallet coordinate space. In some examples, the plurality of items may be disposed on a pallet that rests on a support surface and the first item is the furthest from the support surface.

Figure 9:
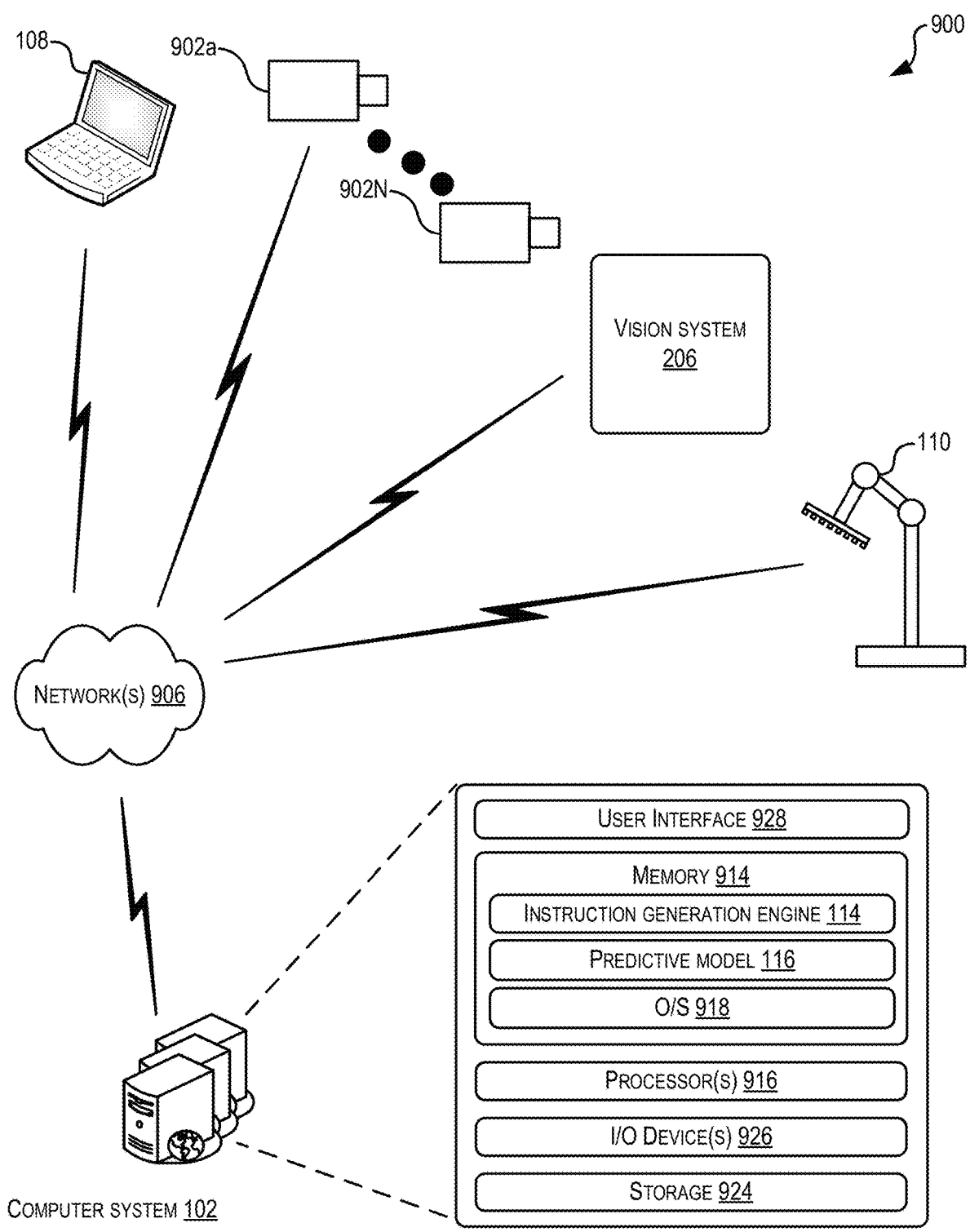
FIG. 9 illustrates a system or architecture for implementing techniques relating to robotic manipulation of cuboidal items, according to at least one example.

FIG. 9 illustrates a system or architecture 900 for implementing techniques relating to robotic manipulation of cuboidal items, according to at least one example. The system 900 includes the robotic instruction generation system 102 in communication with the user device 108, the vision system 206, the robotic manipulator 110, and one or more sensors 902a-902N via one or more networks 906 (hereinafter, "the network 906") and/or one or more wired connections. The network 906 may include any one or a combination of many different types of networks, such as radio networks, cable networks, the Internet, wireless networks, cellular networks, and other private, and/or public networks.

The robotic instruction generation system 102 may include one or more server computers, perhaps arranged in a cluster of servers or as a server farm. These servers may be configured to perform computing operations as described herein. In some examples, the servers (and the components thereof) may be distributed throughout more than one location. The servers may also be virtual computing resources. The robotic instruction generation system 102 may be implemented as part of an inventory management system that is associated with an electronic marketplace. Through the electronic marketplace, users may place orders for items. In response, the inventory management system may determine delivery instructions for retrieving the items from their physical storage locations and coordinating their shipping.

The robotic instruction generation system 102 may include at least one memory 914 and one or more processing units (or processor(s)) 916. The processor 916 may be implemented as appropriate in hardware, computer-executable instructions, software, firmware, or combinations thereof. Computer-executable instruction, software, or firmware implementations of the processor 916 may include computer-executable or machine-executable instructions written in any suitable programming language to perform the various functions described. The memory 914 may include more than one memory and may be distributed throughout the robotic instruction generation system 102. The memory 914 may store program instructions that are loadable and executable on the processor(s) 916, as well as data generated during the execution of these programs. Depending on the configuration and type of memory including the robotic instruction generation system 102, the memory 914 may be volatile (such as random access memory (RAM)) and/or non-volatile (such as read-only memory (ROM), flash memory, or other memory). The memory 914 may include an operating system 918 and one or more application programs, modules, or services for implementing the features disclosed herein including at least the instruction generation engine 114 and the predictive model 112.

The robotic instruction generation system 102 may also include additional storage 924, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 924, both removable and non-removable, are examples of computer-readable storage media, which may be non-transitory. For example, computer-readable storage media may include volatile or non-volatile, removable or non-removable media implemented in any suitable method or technology for storage of information such as computer-readable instructions, data structures, program modules, or other data. As used herein, modules, engines, and components, may refer to programming modules executed by computing systems (e.g., processors) that are part of the robotic instruction generation system 102.

The robotic instruction generation system 102 may also include input/output (I/O) device(s) and/or ports 926, such as for enabling connection with a keyboard, a mouse, a pen, a voice input device, a touch input device, a display, speakers, a printer, or other I/O device.

The robotic instruction generation system 102 may also include a user interface 928. The user interface 928 may be utilized by an operator or other authorized user to access portions of the robotic instruction generation system 102. In some examples, the user interface 928 may include a graphical user interface, web-based applications, programmatic interfaces such as application programming interfaces (APIs), or other user interface configurations. In some examples, the user interface 928 is presented at one of the control devices 207.

The user device 108 may be any suitable type of computing device such as, but not limited to, a tablet, a mobile phone, a smart phone, a personal digital assistant (PDA), a laptop computer, a desktop computer, a thin-client device, a tablet computer, or any other suitable device capable of communicating with the robotic instruction generation system 102, the robotic manipulator 110, and/or other elements of the system 900 via the network 906 in accordance with techniques described herein.

The vision system 206 and the robotic manipulator 110 may be configured as described herein. The one or more sensors 902 may include an image sensor and depth sensor as described herein. In some examples, the one or more sensors 902 are used in addition to the vision system 206 and/or in place of the vision system 206.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A robotic manipulation system, comprising: a robotic manipulator positioned to manipulate items within a work environment; an image sensor positioned proximate the work environment; a depth sensor positioned proximate the work environment; a memory comprising computer-executable instructions; and a processor in communication with the memory, the robotic manipulator, the image sensor, and the depth sensor, the processor configured to: instruct the image sensor to capture a top view image depicting a plurality of cuboidal items disposed within the work environment and arranged into a stack comprising other cuboidal items, the top view image depicting the plurality of cuboidal items from a top view and comprising substantially all cuboidal items disposed in a topmost layer of the stack; determine, using a neural network based on a U-Net architecture, probability values for pixels in a portion of the top view image, individual probability values of the probability values are included in a binary matrix and indicate a probability that a pixel represents an item boundary corresponding to the plurality of cuboidal items, the neural network comprising a plurality of skip connections extending between a plurality of contracting layers and a plurality of expanding layers; instruct the depth sensor to capture depth data, the depth data representing the plurality of cuboidal items; generate a first top view item image depicting the item boundary corresponding to a first cuboidal item of the plurality of cuboidal items based at least in part on (i) the binary matrix that includes the individual probability values and (ii) a top item mask formed from the depth data; determine a first plane corresponding to a first top surface of the first cuboidal item based at least in part on the depth data; determine first coordinates of corners of a first bounding box based at least in part on the first top view item image and the first plane, the first bounding box being aligned with the first plane and representing the first top surface of the first cuboidal item; determine, based at least in part on the first bounding box, instructions for the robotic manipulator to manipulate the first cuboidal item at the first top surface; and instruct the robotic manipulator to use the instructions to manipulate the first cuboidal item at the first top surface.

2. The system of claim 1, wherein instructing the image sensor to capture the to view image comprises instructing the image sensor to capture the top view image at a first time, and wherein instructing the depth sensor to capture the depth data comprises instructing the depth sensor to capture the depth data at the first time.

3. The system of claim 1, wherein the processor is further configured to detect a first item boundary corresponding to the first cuboidal item of the plurality of cuboidal items based at least in part on probability scores of first pixels representing the first item boundary, and wherein determining the instructions for the robotic manipulator is based at least in part on the first item boundary.

4. The system of claim 1, wherein the processor is further configured to at least determine a centroid of the first bounding box, and wherein determining the instructions for the robotic manipulator is based at least in part on the centroid.

5. The system of claim 1, wherein the processor is further configured to:
compare a portion of the depth data with other depth data obtained after the robotic manipulator has manipulated the first cuboidal item to generate differential depth data; and
process the differential depth data to:
determine a successful movement of the first item; and
associate the differential depth data with a label representing the successful movement to define labeled differential data.

6. A computer-implemented method, comprising:
determining, using a predictive model, probability values for pixels in image data representing a plurality of items arranged into a stack comprising other items, the image data representing the plurality of items from a top view and comprising substantially all items disposed in a topmost layer of the stack, individual probability values of the probability values included in a binary matrix and indicating probabilities that pixels in the image data represent item boundaries corresponding to the plurality of items;
determining a first top view item image depicting a first item boundary corresponding to a first item of the plurality of items based at least in part on (i) probability values of first pixels included in the binary matrix that represent the first item boundary and (ii) a top item mask formed from depth data that represents heights of the plurality of items;
determining a first set of coordinates associated with a first top surface of the first item based at least in part on the first top view item image and the depth data;
generating robotic instructions for manipulation of the first item based at least in part on the first item boundary and the first set of coordinates;
comparing a portion of the depth data with other depth data to generate a differential depth data; and
processing the differential depth data to:
determine a successful movement of the first item; and
associate the differential depth data with a label representing the successful movement to define labeled differential data.

7. The computer-implemented method of claim 6, wherein the predictive model comprises a set of contracting layers configured to capture context of each pixel in the image data, and a set of expanding layers configured to localize each pixel in the image data.

8. The computer-implemented method of claim 6, further comprising, prior to determining the first set of coordinates:
determining a first plane corresponding to the first top surface of the first item based at least in part on the depth data; and
determining a first bounding box that is aligned with the first plane and represents the first top surface of the first item, wherein the first set of coordinates represent corners of the first bounding box.

9. The computer-implemented method of claim 6, further comprising receiving configuration information associated with at least one of the image data or the depth data, and wherein detecting the first item boundary and determining the first set of coordinates are based at least in part on the configuration information.

10. The computer-implemented method of claim 9, wherein the configuration information represents at least one of (i) one or more properties of an image sensor that outputs the image data, (ii) information for mapping an image space associated with the image sensor to a depth space associated with a depth sensor that outputs the depth data, or (iii) information for transforming from the depth space to a robotic manipulator space associated with a robotic manipulator configured to implement the robotic instructions.

11. The computer-implemented method of claim 6, further comprising:
receiving the image data from an image sensor positioned to image the plurality of items; and
receiving the depth data from a depth sensor positioned to image the plurality of items.

12. The computer-implemented method of claim 11, wherein a first clock of the image sensor and a second clock of the depth sensor are coordinated.

13. The computer-implemented method of claim 6, further comprising:
instructing a robotic manipulator to manipulate the first item in accordance with the robotic instructions; and
obtaining the other depth data after the robotic manipulator has manipulated the first item in accordance with the robotic instructions.

14. The computer-implemented method of claim 6, wherein the plurality of items is disposed on a pallet, and wherein generating the robotic instructions comprises transforming the first set of coordinates to a pallet coordinate space.

15. The computer-implemented method of claim 6, wherein the image data comprises one or more red-green-blue (RGB) images, and the binary matrix comprises two dimensions and indicates for each pixel of the RGB images, a prediction of whether the respective pixel is an edge of the first item or is not an edge of the first item.

16. The computer-implemented method of claim 6, wherein the predictive model comprises a neural network based on a U-Net architecture, and wherein the predictive model comprises a plurality of skip connections extending between a plurality of contracting layers and a plurality of expanding layers.

17. The computer-implemented method of claim 6, further comprising using the labeled differential data to train the predictive model.

18. An integrated vision and control device, comprising: an image sensor supported by a housing and positionable to view a working environment from at least a top view; a depth sensor supported by the housing and positionable to view the working environment from at least the top view; a memory supported by the housing and comprising computer-executable instructions; and a processor supported by the housing and in communication with the memory, the image sensor, and the depth sensor, the processor configured to: instruct the image sensor to obtain image data from the top view, the image data representing a plurality of cuboidal items arranged in the work environment into a stack comprising other cuboidal items, the image data representing the plurality of cuboidal items from the top view and comprising substantially all cuboidal items disposed in a topmost layer of the stack; instruct the depth sensor to obtain depth data from the top view, the depth data representing the plurality of cuboidal items; determine, using a predictive model and based at least in part on the image data, a top view item image depicting an item boundary corresponding to a particular cuboidal item of the plurality of cuboidal items based at least in part on (i) probability values output from the predictive model and included in a binary matrix and (ii) a top item mask formed from the depth data, wherein the predictive model comprises a neural network based on a U-Net architecture, and wherein the predictive model comprises a plurality of skip connections extending between a plurality of contracting layers and a plurality of expanding layers; determine, based at least in part on the depth data, a two-dimensional plane corresponding to a top surface of the particular cuboidal item; and determine coordinates of the top surface of the particular cuboidal item based at least in part on the top view item image depicting the item boundary and the two-dimensional plane.

19. The device of claim 18, wherein the processor is further configured to determine instructions for a robotic manipulator to manipulate the particular cuboidal item at the top surface based at least in part on the coordinates of the top surface.

20. The device of claim 18, wherein the processor is further configured to determine a bounding box aligned with the two-dimensional plane and with dimensions corresponding in size and shape to the top surface, and wherein the coordinates of the top surface comprise a set of coordinates each of which corresponding to one of a plurality of corners of the bounding box.

* * * * *